(12) United States Patent
Javaherian et al.

(10) Patent No.: US 8,196,563 B2
(45) Date of Patent: Jun. 12, 2012

(54) METHOD AND APPARATUS FOR CONTROLLING COMBUSTION PHASING IN AN INTERNAL COMBUSTION ENGINE

(75) Inventors: Hossein Javaherian, Rochester Hills, MI (US); Alan W. Brown, Canton, MI (US); Michael P. Nolan, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 327 days.

(21) Appl. No.: 12/694,330

(22) Filed: Jan. 27, 2010

(65) Prior Publication Data

US 2010/0212632 A1 Aug. 26, 2010

Related U.S. Application Data

(60) Provisional application No. 61/154,514, filed on Feb. 23, 2009.

(51) Int. Cl.
*F02P 5/04* (2006.01)
*F02P 5/06* (2006.01)

(52) U.S. Cl. .................................................. 123/406.23

(58) Field of Classification Search ............. 123/406.23, 123/406.24, 406.35, 406.41, 406.42; 701/101, 701/110
See application file for complete search history.

(56) References Cited

U.S. PATENT DOCUMENTS

| 7,347,184 B2 * | 3/2008 | Kuroda et al. ................. 123/434 |
| 7,389,682 B2 | 6/2008 | Javaherian |
| 2007/0106451 A1 * | 5/2007 | Kuroda et al. ................. 701/103 |
| 2007/0192015 A1 * | 8/2007 | Konishi ......................... 701/102 |
| 2008/0125954 A1 * | 5/2008 | Kuroda et al. ................. 701/103 |

OTHER PUBLICATIONS

Larsson, Stefan, et al., An Experimental Evaluation of Torque Sensor Based Feedback Control of Combustion Phasing in an SI-engine; SAE Technical Paper 2005-01-0060; 2005 SAE World Congress; Apr. 2005.
Andersson, Ingemar, et al., Torque Ratio Concept for Combustion Phasing Detection of a Spark Ignited Engine; IEEE; 43rd IEEE Conference on Decision and Control; Dec. 2004.

* cited by examiner

*Primary Examiner* — Mahmoud Gimie

(57) ABSTRACT

Operating an engine includes monitoring engine crank position, a corresponding engine torque, and an engine operating point. A state of an engine control parameter is adjusted in response to a difference between an identified location of peak torque and a preferred location of peak torque.

15 Claims, 2 Drawing Sheets

METHOD AND APPARATUS FOR CONTROLLING COMBUSTION PHASING IN AN INTERNAL COMBUSTION ENGINE

CROSS REFERENCE TO RELATED APPLICATIONS

This application claims the benefit of U.S. Provisional Application No. 61/154,514, filed on Feb. 23, 2009, which is incorporated herein by reference.

TECHNICAL FIELD

This disclosure is related to control of internal combustion engines.

BACKGROUND

The statements in this section merely provide background information related to the present disclosure and may not constitute prior art.

Known engine operation includes delivering fuel and air to combustion chambers and igniting the corresponding mixture, and transferring the pressure generated by the ignited mixture to a crankshaft via a moveable piston. Engine operating parameters of interest include in-cylinder pressure, engine torque, specific fuel consumption, emissions, and others. Engine control parameters include fuel mass and injection timing, spark ignition timing in spark ignition engines, phasing, magnitude and duration of engine valve opening and closing, recirculated exhaust gas fraction, and other parameters. Known engine control schemes include monitoring states of engine operating parameters and controlling engine control parameters to achieve preferred targets corresponding to in-cylinder pressure, engine torque, specific fuel consumption, and emissions.

It is known to control combustion in individual cylinders using data corresponding to in-cylinder combustion parameters. One exemplary in-cylinder combustion parameter includes location of peak cylinder pressure (LPP) in crank angle degrees, which is an indicator of peak in-cylinder combustion pressure. In-cylinder pressure sensors monitor in-cylinder pressures for individual cylinders during ongoing engine operation, and are coupled to signal processing devices. Known engine control schemes use the monitored in-cylinder pressures for individual cylinders to control engine control parameters including, e.g., spark timing, fuel injection timing, and EGR mass flowrate.

Another exemplary in-cylinder combustion parameter is a location of mass-burn fraction (MBF), which is an estimate of percentage of a cylinder charge that is combusted at a given crank angle. One mass-burn fraction of interest is a 50% mass-burn fraction (CA50), which is a crank angle location at which 50% of an individual cylinder charge is burned.

Monitoring the 50% mass-burn fraction is one known method to parameterize combustion phasing for a cylinder. During engine combustion operating under a particular set of parameters, the 50% mass-burn fraction is predictable to within a small range for given engine operating conditions. One known method to estimate the 50% mass-burn fraction includes examining pressure data from within the combustion chamber, including analyzing the pressure rise within the combustion chamber attributable to combustion. Various methods exist to quantify pressure rise in a combustion chamber attributable to combustion. One method includes pressure ratio management (PRM) which is based upon the Rassweiler approach, which approximates the 50% mass-burn fraction by a fractional pressure rise due to combustion. Combustion of a known charge at a known time under known conditions tends to produce a consistently predictable pressure rise within the combustion chamber. PRM derives a pressure ratio from the ratio of a measured cylinder pressure under combustion at a given crank angle to a calculated motored pressure, estimating a pressure value if no combustion took place in the cylinder, at a given crank angle. Any rise in pressure above the motored pressure is attributable to energy introduced by combustion. Thus, PRM can be used to describe the combustion process within a cylinder, including combustion phasing information, with the pressure ratio value normalized at a given crank angle, and a fractional pressure ratio useful for estimating the 50% mass-burn fraction.

Known engine control schemes include monitoring peak cylinder pressure (LPP) in crank angle degrees, which is an indicator of peak in-cylinder combustion pressure. In-cylinder pressure sensors coupled to signal processing devices are used during ongoing engine operation to monitor in-cylinder pressures for individual cylinders. Known engine control schemes use the monitored in-cylinder pressures for individual cylinders to control engine control parameters including, e.g., spark timing, fuel injection timing, and EGR mass flowrate.

SUMMARY

A method for operating a multi-cylinder internal combustion engine includes monitoring signal outputs from an engine torque sensing device to determine engine torque and monitoring corresponding engine crank positions from a crank position sensor during an individual cylinder event and determining an associated engine operating point. A location of peak torque for the individual cylinder event is identified, the location of peak torque including an engine crank position corresponding to a peak engine torque for the individual cylinder event. A difference between the identified location of peak torque and a preferred location of peak torque is determined, the preferred location of peak torque associated with the engine operating point. A state of an engine control parameter is adjusted in response to the difference between the identified location of peak torque and the preferred location of peak torque.

BRIEF DESCRIPTION OF THE DRAWINGS

One or more embodiments will now be described, by way of example, with reference to the accompanying drawings, in which.

DETAILED DESCRIPTION

Figure 1:
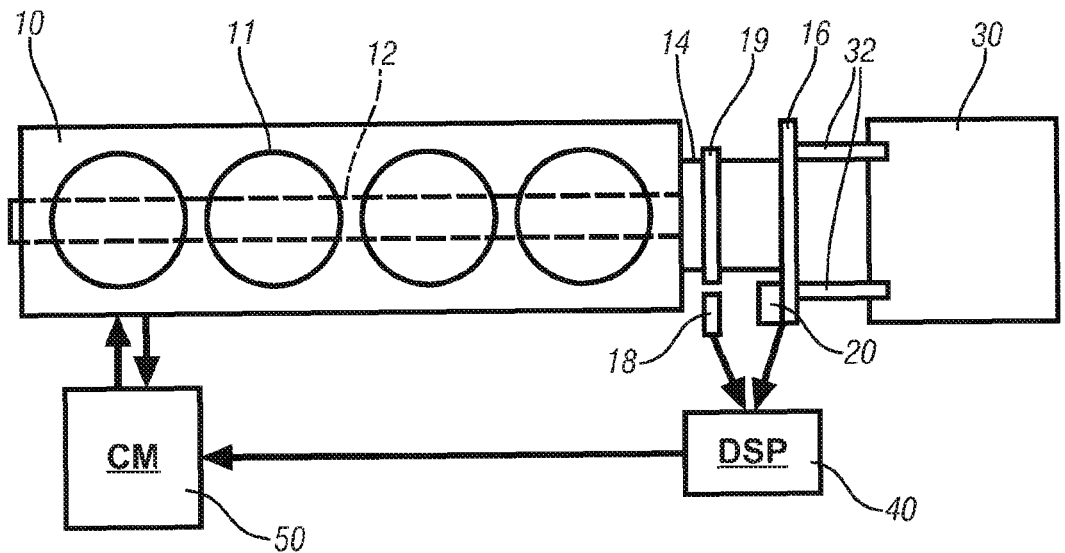
FIG. 1 is a schematic diagram of a multi-cylinder internal combustion engine including an engine output member coupled to a gearbox of a transmission device and including a crankshaft position sensor and a torque sensing device in accordance with the present disclosure.

Referring now to the drawings, wherein the depictions are for the purpose of illustrating embodiments only and not for the purpose of limiting the same, FIG. 1 schematically illustrates a multi-cylinder internal combustion engine 10 constructed in accordance with an embodiment of the disclosure. The exemplary engine 10 has reciprocating pistons movable in cylinders which define variable volume combustion chambers 11. The reciprocating pistons couple to a crankshaft 12. The crankshaft 12 couples to an engine output member 14 that preferably couples to a gearbox 30 of a transmission device and a driveline to transfer engine torque thereto in response to an operator torque request. The engine output member 14 preferably includes a flexplate 16 through which engine torque is transferred to the gearbox 30 of the transmission device. The engine 10 includes sensing devices configured to monitor engine states associated with engine operation and actuators that control different areas of engine operation. The sensing devices and actuators are signally and operatively connected to a control module (CM) 50. It is appreciated that the engine 10 can employ a four-stroke operation wherein each engine combustion cycle includes 720 degrees of angular rotation of the crankshaft 12 divided into repetitively occurring combustion strokes including intake-compression-expansion-exhaust. It is appreciated that the engine 10 can operate in one of various combustion cycles, including four-stroke, combustion cycles, two-stroke combustion cycles and six-stroke combustion cycles. It is appreciated that the engine 10 can include an engine configured to operate in one or more engine combustion modes including, e.g., spark-ignition, compression-ignition, controlled auto-ignition (i.e., homogeneous-charge compression ignition), and premixed charge compression ignition.

The sensing devices include a crankshaft position sensor 18 and associated crank wheel 19 configured to monitor a rotational angle Θ of the crankshaft 12, from which the control module 50 determines engine crank angle and rotational speed N of the crankshaft 12, and position of each piston and associated combustion stroke. In one embodiment, the crank wheel 19 includes a 360X wheel corresponding to 360° of rotation of the crankshaft 12 which can be monitored by the crankshaft position sensor 18. It is appreciated that crankshaft encoder devices and other rotational position sensing devices may be employed to achieve similar measurement results. When the crank wheel 19 includes a 360X wheel, combustion sensing including engine torque sensing can be associated with each degree of crankshaft rotation in a discretized manner. It is appreciated that a low resolution crankshaft position sensor can similarly be used with enhanced torque resolution techniques.

The engine 10 is configured to monitor engine load. It is appreciated that engine load is an engine parameter that can be measured directly using a sensing device or inferred from related inputs. In one embodiment, engine load can be determined using a manifold absolute pressure (MAP) sensor. In one embodiment, engine load can be determined using an accelerator pedal sensor. In one embodiment, engine load can be determined using an engine airflow sensor. In one embodiment, engine load can be inferred based upon engine fuel flow. An engine operating point can be determined that corresponds to the rotational speed N of the crankshaft 12 and the engine load.

The engine 10 includes a torque sensing device 20 configured to measure engine torque transferred between the engine 10 and the gearbox 30 of the transmission device via the flexplate 16 by monitoring deformation within the flexplate 16. Alternatively, the torque sensing device 20 can be installed in another location, e.g., mounted directly onto the crankshaft 12. A single torque sensing device 20 can be used. Alternatively a plurality of torque sensing devices 20 can be used. The crankshaft 12 is preferably coaxial with and rigidly coupled to the flexplate 16 to rotate therewith. The flexplate 16 is preferably coupled to the gearbox 30 near an outer rim using a plurality of fasteners 32, allowing the engine 10 to transfer engine torque to drive the gearbox 30 through the flexplate 16. The term "engine torque," as used herein, refers to any turning moment acting upon the crankshaft 12 of the engine 10. The term "flexplate" includes any element used to transfer engine torque within a powertrain, including, e.g., a flexplate and a flywheel.

The torque sensing device 20 measures the engine torque transferred between the engine 10 and the gearbox 30 through the flexplate 16 by quantifying deformations (e.g., negative and positive strain) in the flexplate 16 caused thereby. This includes quantifying a strain field of the flexplate 16, such as a change in a circumferential reference length, stress and strain, or a speed of wave propagation that can be measured using a surface acoustic wave-based torque sensor (SAW). It is understood that true strain exhibited by the flexplate 16 is directly proportional to the experienced stresses, the unit cross-sectional area, and the modulus of elasticity of the material of the flexplate 16, requiring the torque sensing device 20 and associated signal processing hardware and algorithms to be configured for specific parameters of the flexplate 16. In one embodiment, a finite element stress analysis of the flexplate 16 under anticipated engine torque conditions is performed to identify an optimal stress point on the flexplate 16, indicating one or more preferred locations for affixing one or more sensing elements of the torque sensing device 20.

The torque sensing device 20 is fixedly attached to the flexplate 16, and preferably has a signal output that changes in relation to strain in the flexplate 16. The sensing elements of the torque sensing device 20 are preferably attached to the engine-side face of the flexplate 16, and may be welded, bolted and/or bonded to the flexplate 16 using a suitable high-temperature epoxy. The sensing elements of the torque sensing device 20 preferably use one of a plurality of suitable technologies, such as an optical, magnetic, piezoelectric, magnetoelastic, or a resistance based technology to measure the strain, displacement, stress or speed of wave propagation. For example, the sensing elements may include at least one strain gauge device used to measure strain by changing resistance in response to linear deformation associated with strain in the flexplate 16. More preferably, the strain gauge is also thermally compensated to minimize the effect of temperature variations, given the wide range of temperatures anticipated to be experienced by the flexplate 16.

The torque sensing device 20 and the crankshaft position sensor 18 are signally connected to a digital signal processing (DSP) circuit 40, which can include a microcontroller, a digital signal processing circuit and/or an application-specific integrated circuit (ASIC). The signal processing circuit 40 is configured to account for specific parameters of the flexplate 16, including the aforementioned anticipated stresses, the unit cross-sectional area, and the modulus of elasticity of the material of the flexplate 16. The signal processing circuit 40 generates a signal output that is preferably directly proportional to the true strain experienced by the flexplate 16. It is appreciated that the signal processing circuit 40 is configured to monitor data signals generated by the torque sensing device 20 and the crankshaft position sensor 18 and generate output signals corresponding to the engine torque that are discretized to specific rotational angles of the crankshaft 12. The signal processing circuit 40 is further configured to detect a peak or maximum engine torque and corresponding rotational angle Θ of the crankshaft 12 for each of the cylinders 11 for each cylinder event during ongoing engine operation, referred to herein as a Location of Peak Torque (LPT). The signal processing circuit 40 is signally connected to a control module 50 to transmit the detected Location of Peak Torque (LPT) thereto.

The engine 10 includes a plurality of actuators, each of which is controllable to an operating state to operate the engine 10 in response to operator commands, ambient conditions, and system constraints, as is appreciated by skilled practitioners. Controllable engine actuators can include, e.g., fuel injectors, EGR valves, throttle valves, variable cam phasing devices, variable engine valve lift devices, and spark ignition systems on engines so equipped.

The control module 50 is configured to monitor engine operating states and control engine operation by commanding states of engine control parameters during ongoing engine operation. It is appreciated that the functions described as being performed by the control module 50 may be combined into one or more devices, e.g., implemented in software, firmware, application-specific integrated circuitry (ASIC), combinatorial logic circuits, separate ancillary circuits, or other suitable components that provide the described functionality. The control module 50 has a set of control instruction sets that are executed during preset loop cycles such that each instruction set is executed at least once each loop cycle. Loop cycles are typically executed at regular intervals, for example each 0.1, 1.0, 3.125, 6.25, 12.5, 25 and 100 milliseconds during ongoing engine and vehicle operation. Alternatively, an instruction set may be executed in response to occurrence of an event. Event-based instructions and engine operation include engine torque monitoring from the torque sensing device 20, wherein measurements are taken corresponding to each tooth passing on the crank wheel. The control module 50 executes instruction sets to command states of engine control parameters, including controlling the aforementioned actuators including throttle position, fuel injection mass and timing, EGR valve position to control flow of recirculated exhaust gases, spark-ignition timing or glow-plug operation, and control of intake and/or exhaust valve timing, phasing, and lift, on systems so equipped. Furthermore, it is understood that while control module 50 and digital signal processing (DSP) circuit 40 are illustrated discretely, the functions of each may be combined into a unitary module. As used herein, control module, controller, module, processor, processing circuit and similar terms shall mean any suitable combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the functionality described herein.

Figure 2:
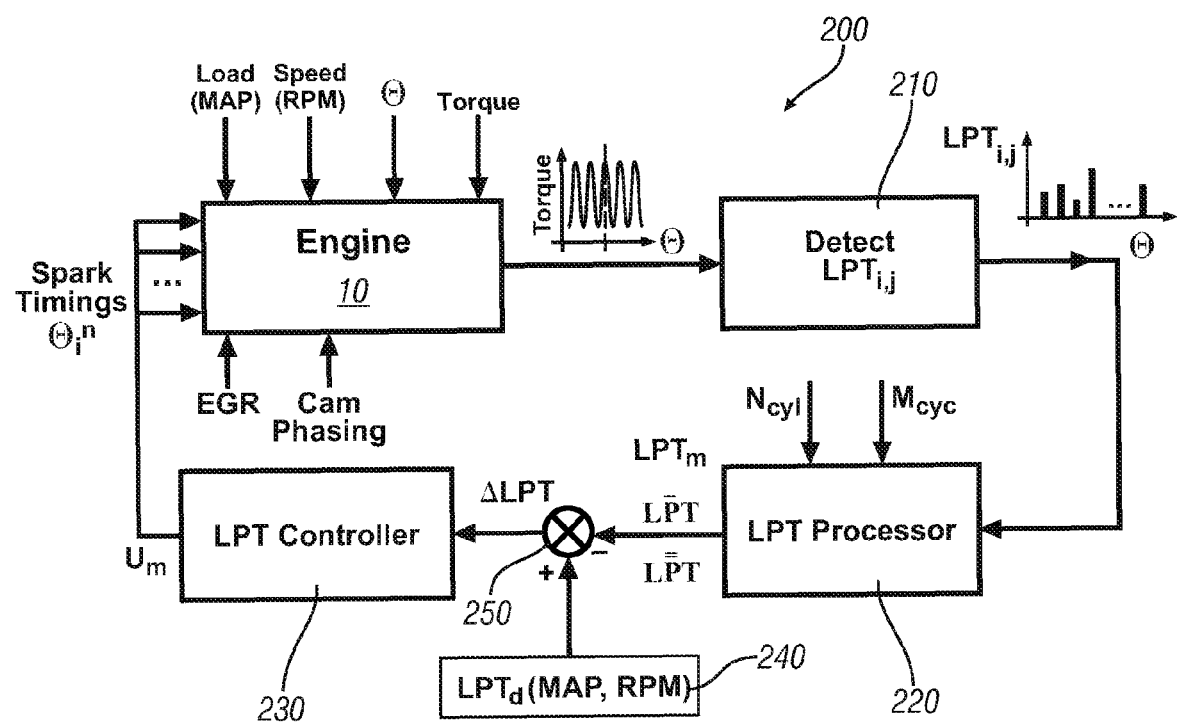
FIG. 2 is a schematic block diagram depicting a control scheme for controlling operation of an internal combustion engine to an operating point in response to an operator torque request to achieve a preferred or desired state for a Location of Peak Torque in accordance with the present disclosure.

FIG. 2 is a schematic block diagram depicting a control scheme 200 for controlling operation of an internal combustion engine, e.g., the internal combustion engine 10 configured as described with reference to FIG. 1. The operation of the internal combustion engine 10 is controlled to an operating point in response to an operator torque request to achieve a preferred or desired state for the Location of Peak Torque $LPT_d$. Stated another way, the internal combustion engine 10 is controlled to achieve a peak torque during each cylinder event for each cylinder 11 at the crank angle Θ of the crankshaft 12 corresponding to the preferred Location of Peak Torque $LPT_d$, with the preferred state for the Location of Peak Torque $LPT_d$ determined based upon the engine operating point. Overall the control scheme 200 includes monitoring engine operation to detect Location of Peak Torque for each cylinder (i) for each cylinder event (j), i.e., $LPT_{i,j}$ (210), determining an average value for the Location of Peak Torque for each cylinder over N engine cycles $L\overline{P}T_i$ and determining an average of the Location of Peak Torque for all the cylinders over the N engine cycles $L\overline{\overline{P}}T$ (220). A preferred state for the Location of Peak Torque $LPT_d$ at the engine operating point is also determined (240). A difference between the preferred and monitored states for the Location of Peak Torque $LPT_d$ and $LPT_m$ (i.e. $L\overline{P}T_i$ or $L\overline{\overline{P}}T$), respectively is determined (250). A control scheme is executed thereon to identify an engine control parameter $U_m$ (230). Operation of the engine 10 is controlled using the engine control parameter $U_m$ based upon the difference between the preferred and monitored states for the Location of Peak Torque $LPT_d$ and $LPT_m$ (i.e. $L\overline{P}T_i$ or $L\overline{\overline{P}}T$), respectively. The control system is designed to control each individual cylinder using $L\overline{P}T_i$ or the average of the cylinders using $L\overline{\overline{P}}T$ values at each engine event.

Operation of the engine 10 is monitored, including monitoring engine torque (Torque) and corresponding crank angle (Θ) using the torque sensing device 20 and the crankshaft position sensor 18. Other engine operating parameters that are preferably monitored include an engine operating point, in terms of engine speed (RPM) and load (MAP), an achieved position of an EGR valve (EGR), and an achieved position of an engine valve cam phaser (Cam Phaser). It is appreciated that these monitored engine operating parameters are illustrative. It is further appreciated that other engine operating parameters may be monitored, depending upon specifics of the engine configuration.

The engine torque (Torque) and corresponding crank angle (Θ) are monitored using the torque sensing device 20 and the crankshaft position sensor 18, and are analyzed to detect the Location of Peak Torque, in crank angle (Θ) for each cylinder i for each cylinder event j, $LPT_{i,j}$ as previously described (210).

The Location of Peak Torque for each cylinder i for each cylinder event j, $LPT_{i,j}$ is analyzed to determine an average value for the Location of Peak Torque $L\overline{P}T_i$ for each cylinder i (i=1, ... $N_{cyl}$) over a quantity of $M_{cyc}$ engine cycles, and an average of the Location of Peak Torque $L\overline{\overline{P}}T$ for all $N_{cyl}$ cylinders over the $M_{cyc}$ engine cycles (220). These can be determined using the following equations.

$$L\overline{P}T_i = \frac{1}{M_{cyc}} \sum_{j=1}^{M_{cyc}} LPT_{i,j}, \; i = 1, \ldots N_{cyl} \qquad [1]$$

$$L\overline{\overline{P}}T = \frac{1}{N_{cyl}} \sum_{i=1}^{N_{cyl}} L\overline{P}T_i \qquad [2]$$

A preferred state for the Location of Peak Torque $LPT_d$ (MAP, RPM) at the engine operating point (MAP, RPM) is also determined (240). It is appreciated that there are a plurality of preferred states for the Location of Peak Torque $LPT_d$(MAP, RPM), each corresponding to subranges of the engine operating point (MAP, RPM) between maximum and minimum states for the engine load (MAP) and speed (RPM). A difference is calculated between the preferred and monitored states for the Location of Peak Torque $LPT_d$ and $LPT_m$ (ΔLPT), respectively, at the engine operating point (250).

The operation of the engine 10 is controlled based upon the calculated difference between the preferred and monitored states for the Location of Peak Torque $LPT_d$ and $LPT_m$ (ΔLPT), respectively, at the engine operating point using an LPT controller (230). The LPT controller executes a control scheme to identify a composite value for the engine control parameter $U_m$ at an associated engine operating point. The LPT controller preferably includes a proportional-integral control scheme that takes into account the Location of Peak Torque $\overline{LPT}_i$ for each cylinder i and the average of the Location of Peak Torque $\overline{LPT}$ for all $N_{cyl}$ cylinders over the $M_{cyc}$ engine cycles to determine a composite value for the engine control parameter $U_m$ that can be used for engine control. In one embodiment the engine control parameter $U_m$ is a spark ignition timing $\theta_i^n$ determined for each of the cylinders i=1 through $N_{cyl}$.

In one embodiment, the preferred state for the Location of Peak Torque $LPT_d$ corresponding to an engine operating point is determined off-line using a representative engine hardware configuration and control system. This includes operating a representative engine and control system configured for spark ignition operation on an engine dynamometer to determine the preferred state for the Location of Peak Torque $LPT_d$ corresponding to an engine operating point. This includes operating a representative engine at selected engine speed/load operating points that traverse an entire range of achievable speed/load operating points. At each of the selected speed/load operating points a control system sweeps the spark ignition timing over a spark advance range for each of the cylinders. Engine torque, crank angle, and corresponding spark advance are determined for each speed/load operating point. A location of peak engine torque, i.e., a crank angle associated with maximum engine torque for each cylinder for each engine cycle and the corresponding spark advance are determined. A relationship is established that includes a preferred spark advance that achieves the preferred location of peak torque $LPT_d$ when the engine is operating at a specific engine operating point, which can be described in terms of engine operating parameters, e.g., engine speed (RPM) and load (MAP). In one embodiment, a calibration array is generated that includes preferred locations of peak torque $LPT_d$ corresponding to specific discretized ranges of engine speed (RPM) and load (MAP), represented as $LPT_d$ (RPM, MAP). The calibration array of preferred locations of peak torque associated with a range of engine operating points $LPT_d$(RPM, MAP) can be stored in one of the memory devices of the control module 50. Alternatively, the preferred locations of peak torque associated with the range of engine operating points $LPT_d$(RPM, MAP) can be expressed in equation form that can be executed in the control module 50.

Alternatively, the preferred state for the Location of Peak Torque $\overline{LPT}_d$ corresponding to an engine operating point is determined off-line using a representative engine hardware configuration and control system configured for compression ignition operation. The representative engine is operated on an engine dynamometer to determine the preferred state for the Location of Peak Torque $LPT_d$ corresponding to an engine operating point. This includes operating the representative engine and control system at selected engine speed/load operating points that traverse an entire range of achievable speed/load operating points. At each of the selected speed/load operating points the control system sweeps fuel injection timing over a predetermined range for each of the cylinders. Engine torque, crank angle, and corresponding fuel injection timing are determined for each speed/load operating point. A location of peak engine torque, i.e., a crank angle associated with maximum engine torque for each cylinder for each engine cycle, and the corresponding fuel injection timing are determined.

The control module 50 determines a preferred engine control state to achieve the preferred location of peak torque for the engine operating point $LPT_d$(RPM, MAP). In one embodiment, as shown, the preferred engine control state for controlling operation of the internal combustion engine 10 includes controlling ignition timing (Spark Timings) in each cylinder in response to the difference between the preferred Location of Peak Torque $LPT_d$(RPM, MAP) and the monitored $LPT_m$, i.e., (ΔLPT) at the engine operating point. Alternatively, controlling operation of the internal combustion engine 10 includes controlling fuel injection timing in response to the difference between the preferred and monitored states for the difference between the preferred Location of Peak Torque $LPT_d$(RPM, MAP) and the monitored $LPT_m$ at the engine operating point. Thus, combustion phasing can be controlled for individual engine cylinders during each individual engine cycle to achieve the preferred Location of Peak Torque $LPT_d$(RPM, MAP). The overall relationship includes determining a preferred engine control state to achieve a preferred combustion phasing for each cylinder event for each engine operating point. The preferred engine control state, e.g., ignition timing, controls engine operation to achieve a preferred location of peak torque to achieve the preferred combustion phasing. A high-bandwidth torque sensor installed on the engine output member (e.g. crankshaft) or flexplate can be used to monitor engine torque associated with individual cylinder combustion, and thus monitor individual cylinder combustion phasing. Using the information from the torque sensor, control states for engine actuators including, e.g., ignition timing and fuel injection mass and/or timing are determined and controlled at levels to achieve engine performance parameters related to fuel efficiency, emissions, noise and other operating parameters during ongoing operation. At engine operating conditions resulting in high fuel-efficiency, there is a correlation between a location of 50% mass burn fraction using in-cylinder pressure sensors and a location of peak torque produced in each cylinder at every event. The desired location of peak torque on the crank angle is then determined. Through direct measurement of a location of peak torque at the desired value during real-time engine operation and corresponding engine control, preferred states for the engine performance parameters may be achieved. In this way, preferred combustion phasing using a torque sensor as feedback can be achieved by controlling one of individual cylinder ignition and individual fuel injectors. Thus, engine torque is directly measured non-intrusively and various engine control variables can be adjusted, including, e.g., ignition timing and fuel injection timing and mass using the information contained in the measured high-bandwidth torque signal.

Figure 3:
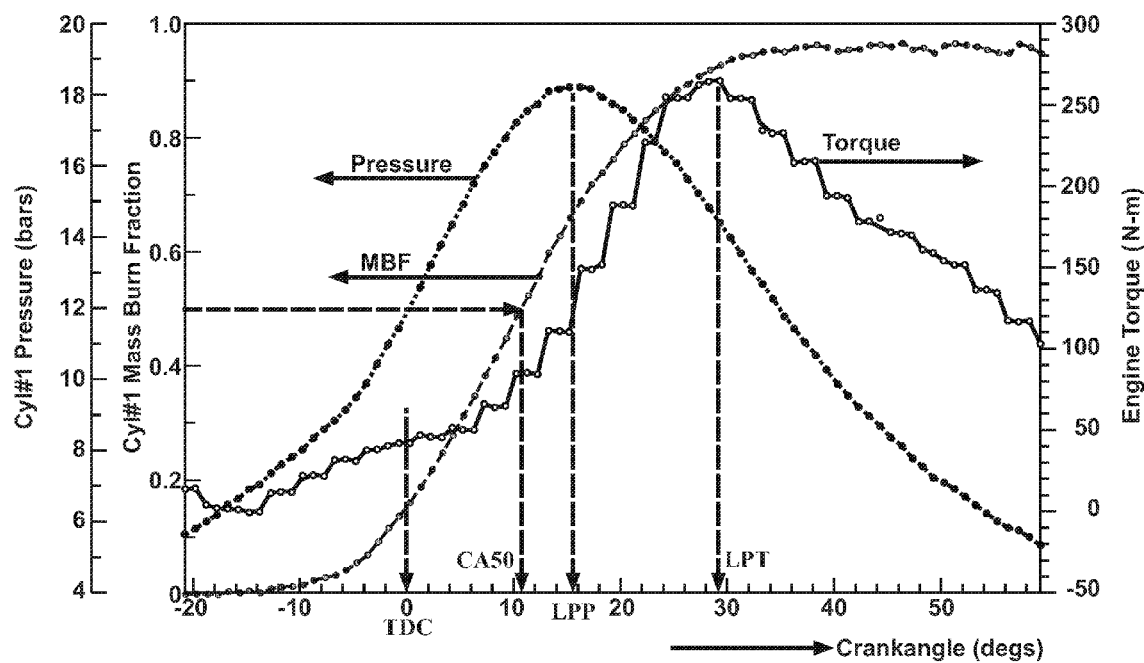
FIG. 3 is a datagraph depicting states of engine combustion parameters including cylinder pressure, mass burn fraction, and engine torque plotted in relation to engine crank angle in accordance with the present disclosure.

FIG. 3 is a datagraph depicting states of engine combustion parameters plotted in relation to engine crank angle relative to a piston position top-dead-center location (TDC). The datagraph depicts results for an engine event in a single cylinder associated with a single engine operating point of an exemplary multi-cylinder engine, the operating point including engine speed and load states. The states of engine combustion parameters include cylinder pressure (Pressure), including a crank-angle location of peak pressure (LPP), mass-burn fraction (MBF), including a crank-angle location for 50% mass-burn fraction (CA50), and engine torque, including a crank-angle location of peak torque (LPT). The results, which are exemplary of other engine operating points, indicate correspondence between the location of peak torque (LPT), the location of peak pressure (LPP), and the location of the 50% mass-burn fraction (CA50). The location of peak torque (LPT) is directly measurable without intruding into the combustion chamber, whereas the location of peak pressure (LPP) for a single cylinder requires an individual cylinder pressure sensor, and the location of the 50% mass-burn fraction (CA50) requires estimation based upon other parameters, e.g., cylinder pressure.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a multi-cylinder internal combustion engine, comprising:
    monitoring signal outputs from an engine torque sensing device to determine engine torque and monitoring corresponding engine crank positions from a crank position sensor during an individual cylinder event and determining an associated engine operating point;
    identifying a location of peak torque for the individual cylinder event, the location of peak torque comprising an engine crank position corresponding to a peak engine torque for the individual cylinder event;
    determining a difference between the identified location of peak torque and a preferred location of peak torque, the preferred location of peak torque associated with the engine operating point; and
    adjusting a state of an engine control parameter in response to the difference between the identified location of peak torque and the preferred location of peak torque.

2. The method of claim 1, further comprising:
    controlling the engine to a selected engine operating point;
    sweeping the engine control parameter between a minimum state and a maximum state and monitoring engine torque and a corresponding crank position for the engine operating point;
    identifying a maximum state for the engine torque and a corresponding state for the engine control parameter; and
    determining the preferred location of peak torque, which comprises a crank position for the engine operating point corresponding to the state for the engine control parameter that achieves the maximum state for the engine torque at the engine operating point.

3. The method of claim 1, wherein adjusting the state of the engine control parameter in response to the difference between the identified location of peak torque and the preferred location of peak torque comprises adjusting timing of spark ignition in response to the difference between the preferred location of peak torque and the identified location of peak torque.

4. The method of claim 1, wherein adjusting the state of the engine control parameter in response to the difference between the identified location of peak torque and the preferred location of peak torque comprises adjusting timing of fuel injection in response to the difference between the preferred location of peak torque and the identified location of peak torque.

5. The method of claim 1, further comprising
    monitoring engine crank position and a corresponding engine torque for each cylinder during recurring individual cylinder events and monitoring associated engine operating points;
    identifying states for the location of peak torque associated with the recurring individual cylinder events for each of the cylinders and calculating a mean value for the location of peak torque associated therewith; and
    identifying the location of peak torque as the calculated mean value for the location of peak torque.

6. The method of claim 1, wherein the torque sensing device comprises a torque sensing device configured to measure engine torque transferred between the engine and a transmission gearbox via a flexplate.

7. The method of claim 6, wherein the torque sensing device comprises a plurality of torque sensing devices configured to measure engine torque transferred between the engine and a transmission gearbox via a flexplate.

8. Method for operating a multi-cylinder internal combustion engine including a crankshaft coupled to an output member, comprising:
    monitoring engine torque using a torque sensing device attached to the output member and a corresponding engine crank position during an individual cylinder event;
    determining an engine operating point associated with the individual cylinder event;
    identifying a location of a peak engine torque for the individual cylinder event; and
    adjusting a state of an engine control parameter in response to a difference between the identified location of the peak engine torque and a preferred location of peak engine torque.

9. The method of claim 8, wherein the preferred location of peak engine torque is associated with the engine operating point.

10. The method of claim 9, further comprising:
    controlling the engine to a selected engine operating point;
    sweeping the engine control parameter between a minimum state and a maximum state and monitoring engine torque and a corresponding crank position for the engine operating point;
    identifying a maximum state for the engine torque and a corresponding state for the engine control parameter; and
    determining the preferred location of peak engine torque comprising a crank position for the engine operating point corresponding to the state for the engine control parameter that achieves the maximum state for the engine torque at the engine operating point.

11. The method of claim 8, wherein adjusting the state of the engine control parameter in response to the difference between the identified location of peak engine torque and the preferred location of peak engine torque comprises adjusting timing of spark ignition in response to the difference between the preferred location of peak engine torque and the identified location of peak engine torque.

12. The method of claim 8, wherein adjusting the state of the engine control parameter in response to the difference between the identified location of peak engine torque and the preferred location of peak engine torque comprises adjusting timing of fuel injection in response to the difference between the preferred location of peak engine torque and the identified location of peak engine torque.

13. The method of claim 8, further comprising
    monitoring the engine torque and the corresponding engine crank position for each cylinder during recurring individual cylinder events and monitoring associated engine operating points;
    identifying states for the location of peak engine torque associated with the recurring individual cylinder events for each of the cylinders and calculating a mean value for the location of peak engine torque associated therewith; and identifying the location of peak engine torque as the calculated mean value for the location of peak engine torque.

14. An apparatus for operating an internal combustion engine including an output member coupled to a transmission gearbox via a flexplate, comprising:

a plurality of torque sensing devices attached to the flexplate;

a control module monitoring engine torque using the plurality of torque sensing devices attached to the flexplate and monitoring a corresponding engine crank position, determining an engine operating point, identifying an engine crank position corresponding to a location of a peak engine torque for an individual cylinder event, and adjusting a state of an engine control parameter in response to a difference between the identified engine crank position corresponding to the location of peak engine torque and a preferred engine crank position for the engine operating point.

15. The apparatus of claim 14, wherein the preferred engine crank position for the engine operating point comprises an engine crank position corresponding to a preferred location of peak engine torque for the engine operating point.

* * * * *